United States Patent [19]
Langstedt

[11] Patent Number: 5,935,476
[45] Date of Patent: Aug. 10, 1999

[54] DEVICE FOR HEATING A PRESS TOOL USING MAGNETIC INDUCTION HEATING; PRESS HAVING SUCH A DEVICE, AND METHOD OF MANUFACTURE

[75] Inventor: Göran Langstedt, Malmö, Sweden

[73] Assignee: Linlan Induction AB, Staffanstorp, Sweden

[21] Appl. No.: 09/110,838

[22] Filed: Jul. 7, 1998

Related U.S. Application Data

[63] Continuation of application No. PCT/SE97/00060, Jan. 16, 1997.

[30] Foreign Application Priority Data

Jan. 16, 1996 [SE] Sweden .................................. 9600130

[51] Int. Cl.[6] .................................................. H05B 6/10
[52] U.S. Cl. ........................ 219/659; 219/633; 219/632; 219/670; 219/672; 156/272.4; 425/174.8 R; 264/403
[58] Field of Search .................................. 219/659, 670, 219/632, 635, 633, 672, 676, 677; 156/272.4, 274.2, 380.2, 380.6; 425/174.8 R; 264/403, 431, 472

[56] References Cited

U.S. PATENT DOCUMENTS

| | | | |
|---|---|---|---|
| 1,725,465 | 8/1929 | Manson | 219/659 |
| 3,467,806 | 9/1969 | Dixon | 219/659 |
| 4,311,896 | 1/1982 | Junya | 219/670 |
| 5,123,989 | 6/1992 | Horiishi et al. | 156/272.4 |

*Primary Examiner*—Philip H. Leung
*Attorney, Agent, or Firm*—Burns, Doane, Swecker & Mathis, L.L.P.

[57] ABSTRACT

A device for heating a press tool (4), which is mounted in a press (3) for manufacturing products wholly or partially of plastic or composite, consists of a core (1) of electric sheet steel, a coil arrangement (9, 10, 11) placed around the core (1), and a voltage source (12). The voltage source (12) is connected to the coil arrangement (9, 10, 11) for generating a magnetic field in and around the core (1). The core (1) has two poles (8a, 8b) which, between themselves, receive the press tool (4) and are displaceable in relation to one another for applying a press force to the press tool (4) and conduct the generated magnetic field into the press tool (4). A press (3) comprises such a heating device and is used in a manufacturing method where the press tool (4) is heated by the magnetic field supplied thereto.

37 Claims, 2 Drawing Sheets

DEVICE FOR HEATING A PRESS TOOL USING MAGNETIC INDUCTION HEATING; PRESS HAVING SUCH A DEVICE, AND METHOD OF MANUFACTURE

This is a continuation of International Application No. PCT/SE97/00060, filed Jan. 16, 1997, that designates the United States and claims priority from Swedish Application No. 9600130-0, filed Jan. 16, 1996.

BACKGROUND AND SUMMARY

The present invention relates to the heating of a press tool mounted in a press. More specifically, the invention concerns a device which is adapted to magnetically heat a press tool directly in a press, with the possibility of a subsequent rapid cooling of the tool in the press. The invention also concerns a press and a method for manufacturing products wholly or partially of plastic or composite.

When manufacturing products wholly or partially of plastic or composite, use is made of a press, the press tool of which must be heated. This normally takes place by removing the press tool from the press, placing it in a preheating device, such as a furnace, and after heating, again mounting it in the press. A preheating device is disclosed in e.g. U.S. Pat. No. 5,023,419. The handling of the press tool is very time-consuming, which means that the number of finished products per hour will be small.

With a view to reducing the time consumed, it is known to provide the press with hot plates, by means of which the press tool is heated in situ in the press. It takes about 10 min to heat a tool of 1 kg to a temperature of 200° C. by using heat conducted from the hot plates of the press. This is too long for economy in large-scale manufacture of components which are wholly or partially formed of composite.

After heating, the tool must be cooled. Such cooling is normally carried out with water or, when tool inserts of sintered material are involved, with carbon dioxide which is gasified such that a temperature of about −60° C. is achieved, or with liquid nitrogen. If the cooling operation is slow or difficult to control, and the chemical process in the composite therefore cannot be accurately controlled, it is impossible to achieve an acceptable quality of the finished products.

In the manufacture of products wholly or partially of composite, economy has up till now been possible only in the manufacture of expensive components, since the technique of today permits but a few components being manufactured per hour.

One object of the invention is to overcome the above-described drawbacks of prior art, i.e. to provide a device which gives rapid and uniform heating of a press tool mounted in a press, without necessitating the removal of the press tool from the press. The heating device should be of simple design, have high manufacturing capacity and yield final products of high and uniform quality.

The inventive device should also allow rapid, reproducible and economic cooling of the press tool mounted in the press after the above-mentioned heating operation.

One more object of the invention is to provide an energy-saving heating device which can be operated by normal circuit voltage.

It is also desirable to provide a press intended for the manufacture of products wholly or partially of plastic or composite, and a manufacturing method, which achieve the above objects.

According to the invention, these and other objects, which will appear from the following specification, have now been wholly or partially achieved by a device, a press and a method according to the present invention.

BRIEF DESCRIPTION OF THE DRAWINGS

The invention will now be described for the purpose of exemplification and with reference to the accompanying drawings, which schematically illustrate currently preferred embodiments. In the drawings, like parts in the various embodiments have been provided with the same reference numerals.

FIG. 2b is a cross-section taken along line B—B in FIG. 2a.

DETAILED DESCRIPTION

Figure 1:
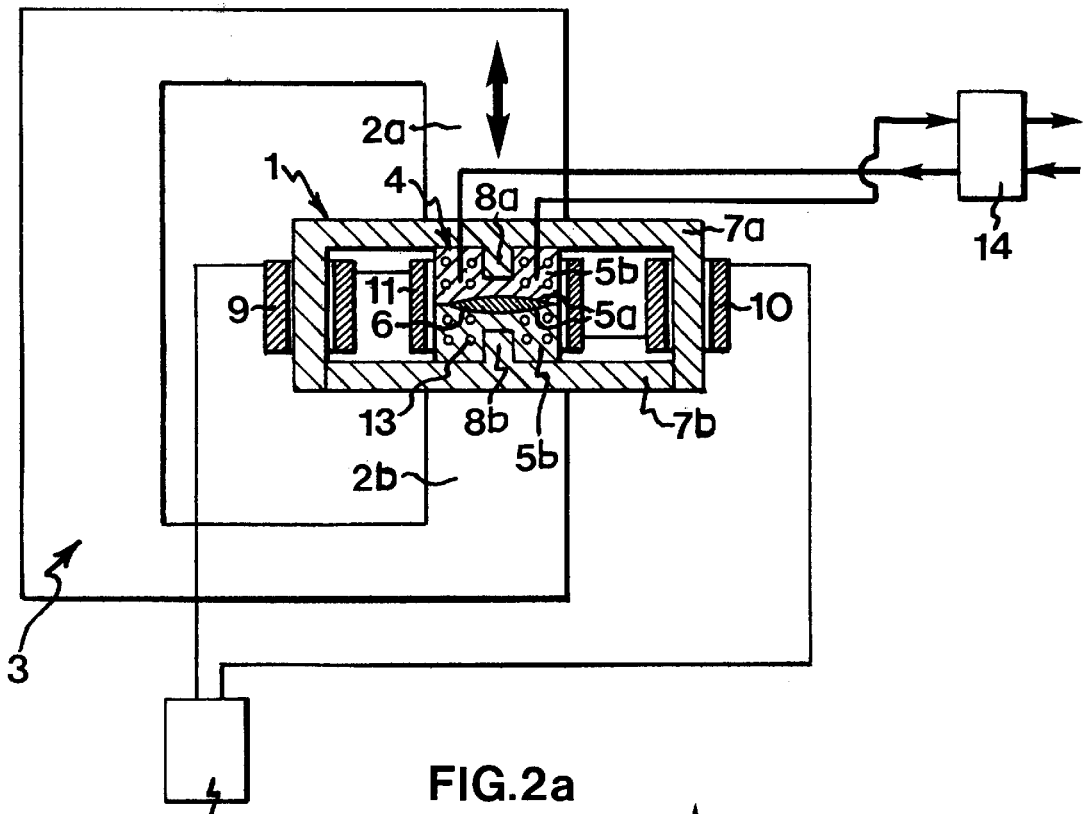
FIG. 1 is part-sectional view of a first embodiment of the invention, in which the poles of the core are recessed in the tool.

FIG. 1 shows a heating device according to the invention, comprising a core 1 of some suitable magnetic material, such as a package of laminae of such electric sheet steel as used in transformer cores. The core 1 is mounted between and abuts against two mutually movable jaws 2a, 2b of a press 3. A press tool 4, which consists of two halves, is arranged within the circumference of the core 1. Each half comprises a shell tool part 5a, which at least partly consists of metal, and an outer layer 5b of electrically nonconductive ceramic material. The tool 4 is adapted to receive a workpiece 6, which consists of a material arranged in the tool and/or injected under pressure.

The core 1 is in the shape of a box with open ends and consists of two parts 7a, 7b which are joined together and movable in relation to one another. The core 1 has on the inside two opposite projections 8a, 8b, which project into the tool halves and form magnetic poles when the heating device is activated. A first coil 9 is arranged around one narrow side of the core 1, and a second coil 10 is arranged around the other, opposite narrow side of the core 1. A third coil 11 is arranged inside the core 1 around the tool 4. The coils 9–11 are connected in series and to a voltage source 12, which operates with one phase and the zero of the electric mains and gives e.g. 200 V at 50 Hz. Alternatively, two or three phases can be used, as will be described in more detail below.

The press tool 4 has in the outer layers 5b cooling ducts 13, which are designed for the passing of a liquid or gaseous working medium having a lower temperature than the tool 4. By thermal conduction, heat is conducted from the tool 4, which thus is cooled. Preferably, use is made of a heat exchanger 14, which on its primary side is passed by a cooling agent, for instance gaseous carbon dioxide with a temperature of −65° C., and which on its secondary side is passed by a working medium, for instance oil.

The inventive press 3 is operated in the following fashion. First a material, such as a glass fibre fabric preimpregnated with polymer material, preferably thermoplastic material, a so-called prepreg, is supplied to the press tool 4, and then the jaws 2a, 2b are pressed together. As a result, also the parts 7a, 7b of the core 1, the poles 8a, 8b and the tool halves are pressed together. The heating device is then activated by applying a voltage to the coils 9–11, which generate magnetic fields which are conducted into the core 1 and in the circuit formed by the tool 4 and which also appear to some extent outside the core 1. The magnetic fields generated by the coils 9–11 and conducted through the core 1 will be conducted in the tool 4 and there cooperate for the heating thereof. The magnetic field outside the core 1 will heat, by induction, the more peripheral metal portions of the tool 4. By using a relatively low frequency of the applied voltage, preferably in the range 16–500 Hz, since higher frequencies tend to result in great losses in the core, a satisfactory penetration depth into the tool and, thus, a uniform heating thereof can be obtained. The frequency should be adapted to the thickness of the tool. If a penetration depth of about 2 cm is desired, a frequency of about 25 Hz is used. If the tool, as will be described below with reference to FIGS. 2a–b, has inserts of sintered material for the purpose of letting through gases which are formed during the treatment of the workpiece or which are used for the cooling thereof, the frequency is suitably adjusted such that also the inserts are heated to a uniform temperature.

The inventive device can be used for heat and pressure treatment of a large number of combinations of materials. In addition to the above-mentioned prepreg, the workpiece 4 may consist of, for instance, a combination of fibre cloth and foils of polymer materials or of a compound of ground fibres, thermoplastic material and a filler. Alternatively, the workpiece may comprise a pre-fabricated fibre body, which is placed in the tool, whereupon a liquid plastic material, for instance a thermoset plastic such as polyurethane or epoxy, is injected into the tool. In this case, the workpiece is normally not cooled immediately after the treatment in the press but is postcured in a separate furnace.

It has been found, for instance, that the embodiment illustrated in FIG. 1 can heat a 50 kg press tool to 200° C. in about 5 min, which should be compared with a corresponding heating time of about 60 min by using conventional technique, i.e. heating via hot plates mounted in the press. By means of the inventive device, the tool can then be cooled to 40° C. in about 2 min. With a process time of about 2 min per workpiece, about 8 workpieces can thus be manufactured per hour by using the invention.

Correspondingly, experiments have been made with a press tool of about 1 kg comprising shell tool parts with a wall thickness of about 2 cm. The poles of the core were recessed in the electrically nonconductive ceramic outer layers into contact with the shell tool parts. The outer layers comprised cooling coils. A thin polypropylene-impregnated glass fibre fabric was placed between the shell tool halves, whereupon the tool was closed. By using an inventive device, the tool could be heated directly in the press to about 200° C. in about 5 s, such that the plastic material melted and formed a surface layer against the tool which had a surface coating of a suitable release agent. After about 20 s at process temperature, the tool was cooled within 10 s to about 40° C. via the cooling coils by using carbon dioxide. Subsequently, the finished product was removed and new material was supplied to the tool. Thus, up to 120 workpieces could be treated per hour. With conventional technique, only about 6 workpieces could be treated per hour in the same tool.

Figure 2A:
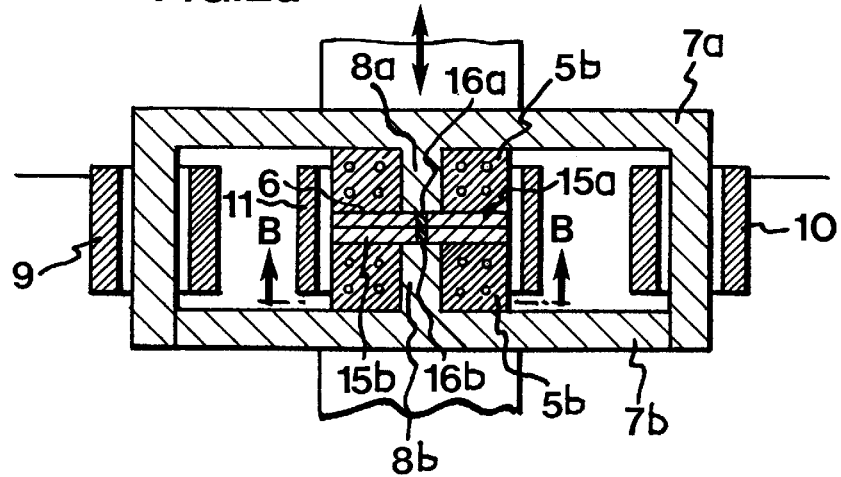
FIG. 2a is a cross-sectional view of a second embodiment, in which the tool comprises plates with tool inserts.

According to a second embodiment as illustrated in FIG. 2a, the tool 4 comprises two plates 15a, 15b which are coupled to the nonconductive ceramic outer layers 5b. The poles 8a, 8b of the core 1 extend through the outer layers 5b and are in contact with the plates 15a, 15b. The magnetic field which is conducted through the core 1 will also be conducted through the plates 15a, 15b. Since each plate 15a, 15b forms a secondary winding of one turn each, also the plates 15a, 15b are heated by the magnetic field. The outer magnetic field from the coil 11 heats the peripheral parts of the tool 4 and the plates 15a, 15b by induction.

Each plate 15a, 15b is provided with a tool insert 16a, 16b of a material which lets through gases from the workpiece and gases that are used for cooling of the tool inserts 16a, 16b and the workpiece 6. The plates 15a, 15b can be provided with cooling ducts (not shown) for rapid and reproducible cooling of the plates 15a, 15b and, thus, the workpiece 6.

Figure 2B:
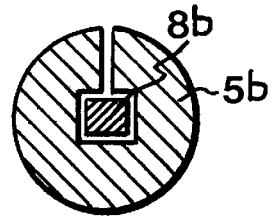

If the outer layers 5b are made of a conductive material, it may be desirable that only the plates 15a, 15b and not the outer layers are heated when the coils 9–11 are activated. This can be achieved by each outer layer 5b being designed so as not to form a secondary winding, as shown in FIG. 2b.

Figure 3:
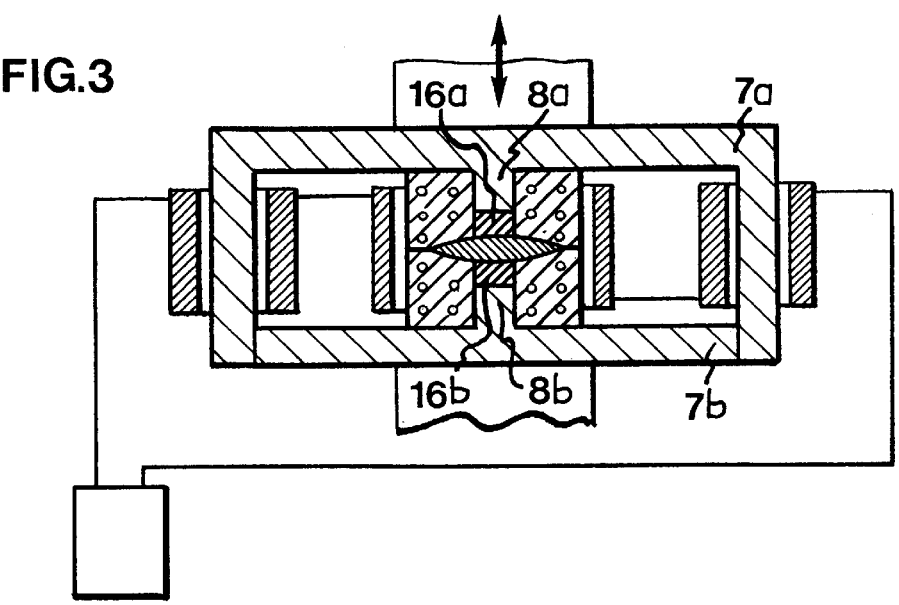
FIG. 3 illustrates a third embodiment, in which the tool has tool inserts of a gas-permeable material.

FIG. 3 shows a third embodiment comprising gas-permeable tool inserts 16a, 16b which are mounted in a recessed manner in the tool halves. The poles 8a, 8b of the core 1 extend through the tool halves into contact with the tool inserts 16a, 16b. When activating the coils 9–11, the tool inserts 16a, 16b are rapidly and uniformly heated to process temperature.

Figure 4:
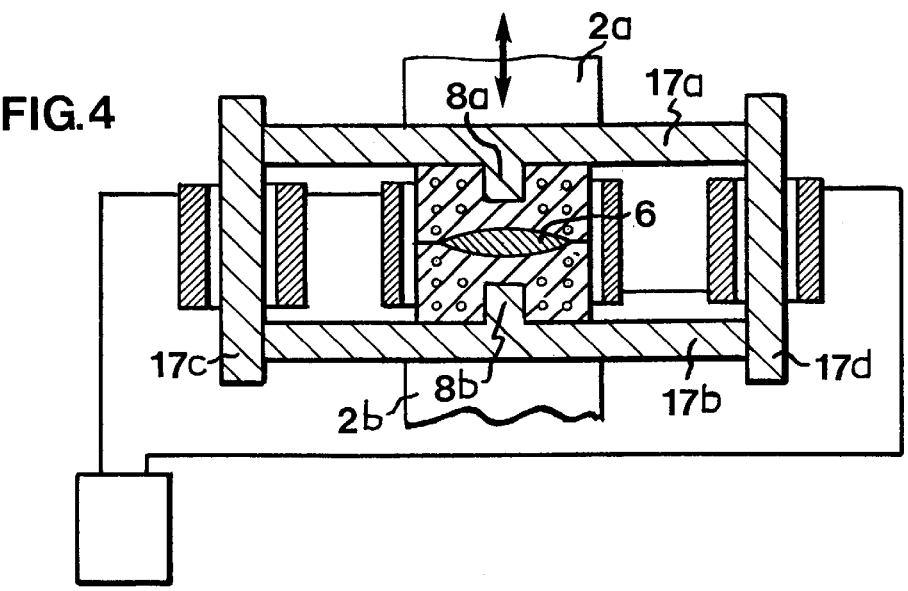
FIG. 4 illustrates a fourth embodiment, in which the magnetic core consists of two movable, horizontal plates which are in contact with two fixed, vertical plates.

FIG. 4 shows a fourth embodiment, where the core 1 consists of four plates 17a, 17b, 17c, 17d, of which two plates 17a, 17b are movable and arranged to abut against the plates 2a, 2b of the press 3 and two plates 17c, 17d are fixed and arranged perpendicular to the movable plates 17a, 17b. Thus, the tool halves can be pressed together by means of the press 3 during working of the workpiece 6, while the magnetic fields are conducted in the core 1, independently of the thickness of the workpiece 6.

Figure 5:
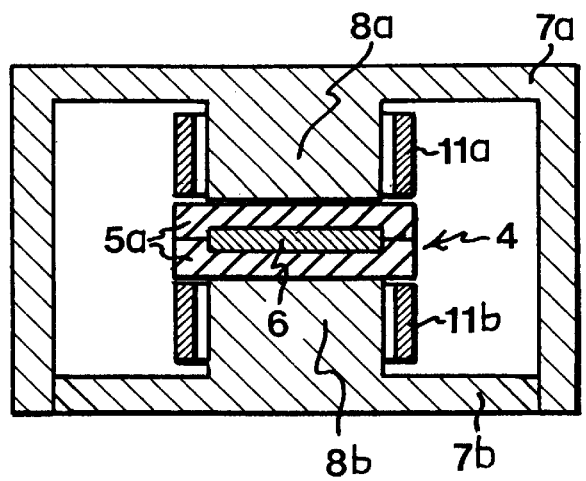
FIG. 5 illustrates a fifth embodiment of the invention with two pole coils each encompassing a pole arranged against the tool.

In the above embodiments, the poles 8a, 8b project into the tool 4, which in most cases is preferred since the height of the heating device thus is minimised. FIG. 5 shows a fifth embodiment, in which the poles 8a, 8b are arranged against the outside of the tool 4. This arrangement is usable, for instance, when the tool 4 is relatively thick and comprises shell tool parts 5a without any ceramic outer layer.

The coil arrangement in FIG. 5 further comprises two pole coils 11a, 11b which are each arranged about a pole 8a, 8b. This coil arrangement renders it possible to mount the pole coils 11a, 11b close to the tool 4 for optimum heating thereof. The extent of the coils 11a, 11b should be adapted to the extent of the tool 4. It has been found that the coils 11a, 11b should be arranged close to the press tool 4, preferably at a distance of some centimeters or less. The losses will be reduced drastically if the coils 11a, 11b are arranged in contact with the press tool 4.

It should be emphasised that the invention generally has the additional advantage that it also allows rational manufacture of structures of plastic or composite which comprise metallic inserts, such as reinforcing steel tubes. The metallic inserts will be heated by the applied magnetic field. This can hardly be achieved with conventional technique.

A further advantage of the invention resides in the fact that the magnetic fields generate vibrations in the press tool, which yield an increased heat transfer and reduces the occurrence of air bubbles in the workpiece.

In all the embodiments described above, the core 1 encompasses the press tool 4. This is advantageous since the encompassing core 4 forms a cage which catches a great part of the generated magnetic fields, which are concentrated adjacent the press tool 4 by means of the poles and heat the press tool. It is certainly conceivable to design the core 1 so as to encompass but a portion of the press tool 4. In that case, however, the power consumption will be higher and the losses will be greater.

The press tool 4 is thus heated by magnetic fields being concentrated therein. Moreover, the pole coil 11 gives an inductive heating of the peripheral parts of the press tool 4. Eddy currents around the contact surface between the poles 8a, 8b and the tool 4 also result in a certain heating of the tool.

In the embodiments shown, the projections or poles 8a, 8b are in direct contact with the shell parts 5a, the plates 15a, 15b or the tool inserts 16a, 16b. This can result in mutual short-circuiting of the steel sheet laminae of the core, which may cause losses and high power consumption. It is therefore preferred that the tool 4 comprises a thin insulating material which is arranged between the poles 8a, 8b and the outside of the shell parts 5a, the plates 15a, 15b or the tool inserts 16a, 16b.

It will be appreciated that the coil arrangement 9–11 can be varied within the scope of the invention. For example, the core coils 9, 10 can be arranged in some other fashion around the core 1. A larger number of core coils can also be used. Further a larger number of pole coils 11a, 11b can be used, for example one around each pole 8a, 8b of the core 1. It is also conceivable to use only pole coils or alternatively only core coils.

The relative displacement of the poles 8a, 8b can be achieved in some other manner. For instance the projections forming the poles can be movable in relation to the rest of the core 1 and be in contact with the jaws 2a, 2b of the press 3. The press force exerted by the jaws 2a, 2b is thus transferred directly via the poles 8a, 8b to the press tool 4.

According to a preferred embodiment (not shown), the press has three heating devices which are connected to a common voltage source and use one phase each thereof. It is also conceivable to arrange in one and the same press an optional number of individually controllable heating devices each heating a part of one or more press tools which extend through the heating device.

It is also possible to provide the core in a heating device with several projections or poles arranged in pairs and to arrange around each pair of poles one or more pole coils. For instance, the core may have three pairs of poles with associated pole coils each using one phase of a common voltage source.

I claim:

1. A device for heating a press tool comprising:
   a core;
   a coil arrangement placed around the core;
   a voltage source connected to the coil arrangement for generating a magnetic field in and around the core, and
   the core having a first and a second pole, the first and the second pole being separate from each other and defining a press tool receiving area for at least partly receiving a press tool to be heated, the first pole being separately displaceable in relation to the second pole such that the first and the second pole are adapted to apply a press force to the press tool, and the first and the second pole being adapted to conduct the magnetic field into the press tool such that the magnetic field heats the press tool.

2. A heating device as claimed in claim 1, wherein the core defines a box-shaped opening adapted to circumscribe the press tool.

3. A heating device as claimed in claim 2, comprising two core coils arranged around respective portions of the core such that magnetic fields generated by the core coils cooperate in the press tool receiving area.

4. A heating device as claimed in claim 2, comprising at least one pole coil arranged around the first and the second pole.

5. A heating device as claimed in claim 2, wherein the box-shaped opening has opposing, open ends.

6. A heating device as claimed in claim 1, comprising two core coils arranged around respective portions of the core such that magnetic fields generated by the core coils cooperate in the press tool receiving area.

7. A heating device as claimed in claim 1, comprising at least one pole coil arranged around the first and the second pole.

8. A heating device as claimed in claim 1, wherein the core comprises four additional poles formed in pairs, at least one pole coil, coupled to a respective phase of the voltage source, being assigned to each pair of poles.

9. A heating device as claimed in claim 1, wherein the coil arrangement includes a first and a second coil circumscribing at least portions of the first and the second poles, each of the first and second coils being bounded on one end thereof by portions of the core.

10. A heating device as claimed in claim 1, further comprising cooling ducts for cooling the press tool.

11. A heating device as claimed in claim 10, wherein the cooling ducts are arranged to cool a workpiece in the press tool.

12. A press tool having a heating device comprising:
    a press tool; and
    at least one device for heating the press tool including
       a core,
       a coil arrangement placed around the core,
       a voltage source connected to the coil arrangement for generating a magnetic field in and around the core, and
       the core having a first and a second pole, the first and the second pole being separate from each other and defining a press tool receiving area in which the press tool is received, the first pole being separately displaceable in relation to the second pole such that the first and the second pole are adapted to apply a press force to the press tool, and the first and the second pole being adapted to conduct the magnetic field into the press tool such that the magnetic field heats the press tool.

13. A press tool as claimed in claim 12, wherein at least portions of the first and the second pole are disposed in recesses in the press tool.

14. A press tool as claimed in claim 12, wherein the press tool includes at least one tool insert of a gas-permeable material, the at least one tool insert being arranged to contact at least one of the poles.

15. A press tool as claimed in claim 14, wherein at least portions of the first and the second pole are disposed in recesses in the press tool.

16. A press tool as claimed in claim 12, further comprising cooling ducts in the press tool.

17. The press tool as claimed in claim 16, wherein the cooling ducts are arranged to cool a workpiece in the press tool.

18. A press tool as claimed in claim 12, wherein the coil arrangement includes a first and a second coil circumscribing at least portions of the first and the second poles, each of the first and second coils being bounded on one end thereof by portions of the core.

19. A press tool as claimed in claim 12, wherein the core defines a box-shaped opening adapted to circumscribe the press tool.

20. A press tool as claimed in claim 19, wherein the box-shaped opening has opposing, open ends.

21. A press; comprising:
a movable first jaw member;
a second jaw member;
a press tool disposed between the first and the second jaw member; and
at least one device for heating the press tool including
a core,
a coil arrangement placed around the core,
a voltage source connected to the coil arrangement for generating a magnetic field in and around the core, and
the core having a first and a second pole mounted on the first and the second jaw member, respectively, on at least opposite sides of the press tool such that the first and the second pole define a press tool receiving area for at least partly receiving the press tool, the first pole being separately displaceable in relation to the second pole by the movable first jaw member such that the first and the second pole are adapted to apply a press force to the press tool, and the first and the second pole being adapted to conduct the magnetic field into the press tool such that the magnetic field heats the press tool.

22. A press as set forth in claim 21, comprising three heating devices, the voltage source for all three heating devices being a common voltage source, the heating devices each employing one phase of the common voltage source.

23. A heating device as claimed in claim 21, wherein at least portions of the first and the second pole are disposed in recesses in the press tool.

24. A heating device as claimed in claim 21, wherein the press tool includes at least one tool insert of a gas-permeable material, the at least one tool insert being arranged to contact at least one of the poles.

25. A heating device as claimed in claim 21, further comprising cooling ducts in the press tool.

26. The press as claimed in claim 25, wherein the cooling ducts are arranged to cool a workpiece in the press tool.

27. A press as claimed in claim 21, wherein the coil arrangement includes a first and a second coil circumscribing at least portions of the first and the second poles, each of the first and second coils being bounded on one end thereof by portions of the core.

28. A press as claimed in claim 21, wherein the core defines a box-shaped opening adapted to circumscribe the press tool.

29. A press as claimed in claim 28, wherein the box-shaped opening has opposing, open ends.

30. A method of manufacturing products, comprising the steps of:
supplying a starting material to a press tool arranged in a press,
applying a pressure to the press tool,
heating the press tool after first applying the pressure, and
cooling the press tool after a process time,
wherein heating of the press tool is achieved by positioning the press tool in a press tool receiving area of at least one device for heating the press tool, the press tool receiving area being defined by a first and a second pole mounted on a first and a second jaw member of a press, respectively, the first and the second pole forming at least part of a core, and the pressure being applied to the press tool by separately moving at least the first pole together with the first jaw relative to the second pole, the first and the second pole being disposed on at least opposite sides of the press tool, such that the first and the second pole apply the pressure to the press tool, the heating of the press tool being further achieved by generating, with a voltage source connected to the coil arrangement placed around the core, a magnetic field in and around the core such that the first and the second pole conduct the magnetic field into the press tool to heat the press tool.

31. A method as claimed in claim 30, wherein the magnetic field is generated by applying an electric voltage across the coil arrangement, and the core includes magnetic material circumscribing the press tool.

32. A method as claimed in claim 30, wherein the step of supplying the starting material includes arranging a prefabricated fiber body and injecting a plastic material into the press tool.

33. A method as claimed in claim 30, wherein the coil arrangement includes a first and a second coil circumscribing at least portions of the first and the second poles, each of the first and second coils being bounded on one end thereof by portions of the core such that, when the voltage is applied to the first and second coils, the magnetic field generated by the first and second coils provides substantially uniform heating to the press tool.

34. A method as claimed in claim 30, wherein cooling of the press tool is effected in a controlled manner by passing a cooling agent through cooling ducts in the press tool.

35. The method as claimed in claim 34, wherein cooling of the press tool cools the starting material.

36. A method as claimed in claim 30, wherein, upon moving at least the first pole together with the first jaw relative to the second pole, the portion of the core defined by the first and second pole defines a box-shaped opening circumscribing the press tool.

37. A method as claimed in claim 36, wherein the box-shaped opening has opposing, open ends.

* * * * *